US010692066B1

(12) United States Patent
Brown et al.

(10) Patent No.: US 10,692,066 B1
(45) Date of Patent: Jun. 23, 2020

(54) SYSTEMS AND METHODS FOR PAPER CHECK PROCESSING AND PAYEE SETUP

(71) Applicant: Wells Fargo Bank, N.A., San Francisco, CA (US)

(72) Inventors: Liesl Brown, San Francisco, CA (US); Karl Willard, San Francisco, CA (US); Jay Bozicevich, San Francisco, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 1038 days.

(21) Appl. No.: 14/808,802

(22) Filed: Jul. 24, 2015

(51) Int. Cl.
*G06Q 20/22* (2012.01)

(52) U.S. Cl.
CPC .................. *G06Q 20/223* (2013.01)

(58) Field of Classification Search
CPC .................................................. G06Q 20/223
USPC ........................................................ 705/45
See application file for complete search history.

(56) References Cited

U.S. PATENT DOCUMENTS

| 5,412,190 | A | 5/1995 | Josephson et al. | |
|---|---|---|---|---|
| 7,539,646 | B2 * | 5/2009 | Gilder .................... | G06Q 20/04 705/40 |
| 8,165,958 | B1 | 4/2012 | McLaughlin et al. | |
| 8,396,278 | B2 | 3/2013 | Jones et al. | |
| 8,396,279 | B1 | 3/2013 | Ferris et al. | |
| 8,595,096 | B2 | 11/2013 | Breeden, Jr. | |
| 8,626,661 | B2 * | 1/2014 | Gilder .................... | G06Q 20/04 705/44 |
| 8,768,836 | B1 | 7/2014 | Acharya | |
| 10,475,129 | B2 * | 11/2019 | Cole .................... | G06Q 20/401 |
| 2003/0055783 | A1 | 3/2003 | Cataline et al. | |
| 2005/0086139 | A1 | 4/2005 | Blackman | |
| 2006/0206425 | A1 | 9/2006 | Sharma | |
| 2006/0277149 | A1 | 12/2006 | Kouno et al. | |
| 2008/0010215 | A1 * | 1/2008 | Rackley, III ......... | G06Q 20/042 705/70 |
| 2009/0006233 | A1 | 1/2009 | Chemtob | |
| 2010/0161466 | A1 * | 6/2010 | Gilder .................... | G06Q 20/04 705/34 |
| 2011/0166869 | A1 * | 7/2011 | Froelich ................. | G06Q 10/10 705/1.1 |
| 2012/0189186 | A1 | 7/2012 | Csulits et al. | |
| 2013/0125015 | A1 | 5/2013 | Freeny, Jr. | |
| 2013/0226798 | A1 | 8/2013 | Orttung et al. | |
| 2014/0089195 | A1 * | 3/2014 | Ward .................... | G06Q 20/223 705/44 |

(Continued)

OTHER PUBLICATIONS

Red River Employees credit union "Mobile Remote Deposit Capture Services Terms and Conditions" (Year: 2014).*

(Continued)

*Primary Examiner* — Bruce I Ebersman
(74) *Attorney, Agent, or Firm* — Foley & Lardner LLP

(57) ABSTRACT

Methods and systems of generating payees from paper check deposits are disclosed. A financial institution computing system includes a data storage system, a network interface logic enabling the financial institution to exchange data over a network, a check processing logic, and a payment transaction logic. The check processing logic obtains payee information using a paper check deposit request submitted by a recipient. The payment transaction logic uses the payee information to create and store the potential payee in the data storage system.

20 Claims, 7 Drawing Sheets

(56) References Cited

U.S. PATENT DOCUMENTS

2014/0337188 A1    11/2014  Bennett et al.

OTHER PUBLICATIONS

Anderson, M., The Electronic Check Architecture, Version 1.0.2, Financial Services Technology Consortium, Sep. 29, 1998, 29 pages.

* cited by examiner

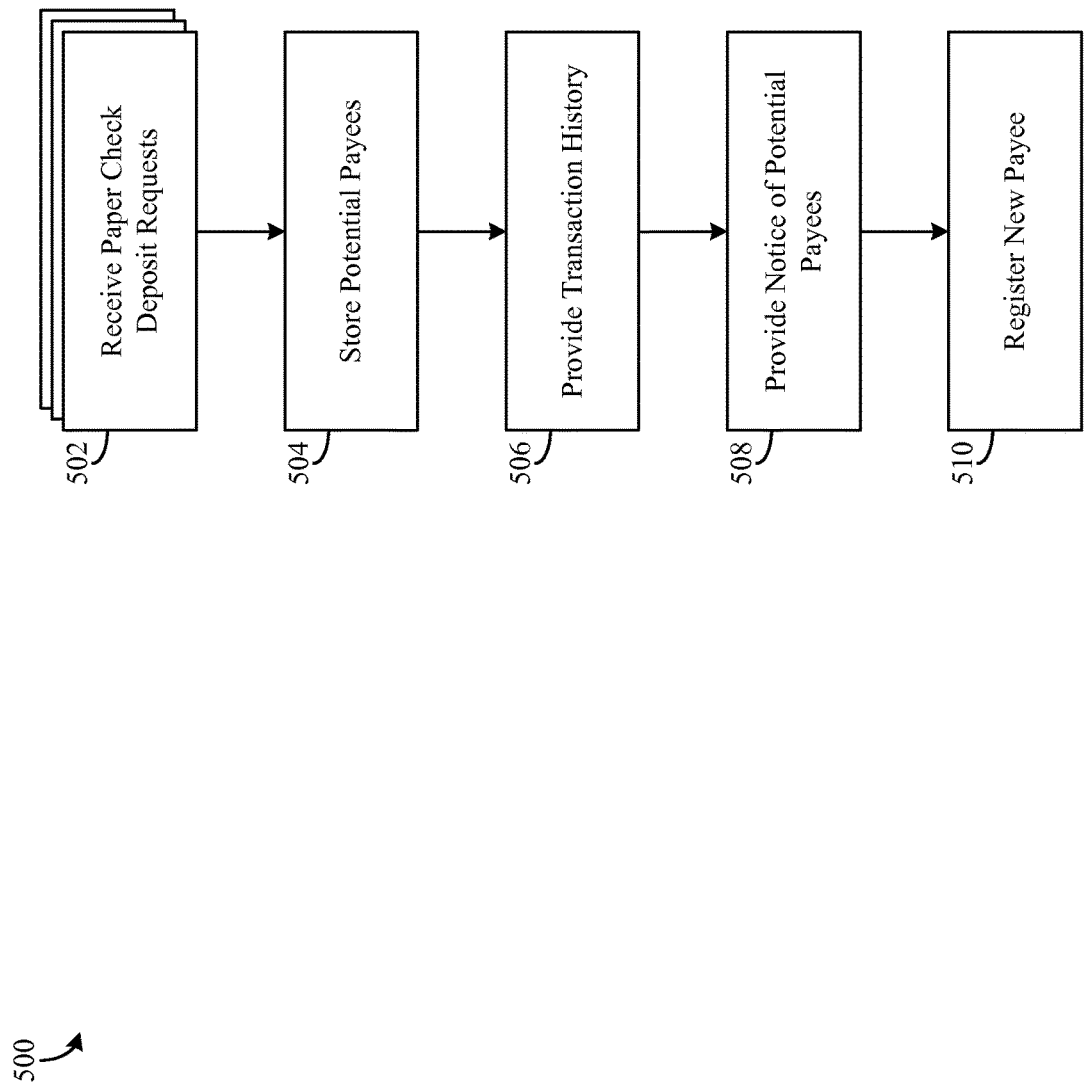

SYSTEMS AND METHODS FOR PAPER CHECK PROCESSING AND PAYEE SETUP

BACKGROUND

A payment transaction involving a customer of a financial institution and a recipient (e.g., an individual or a vendor of goods or services) can be completed with a customer's paper check. The customer's paper check is a hard copy instrument ordering the financial institution to pay a defined sum from the customer's account to the recipient. Printing and issuing new paper checks, along with processing, executing, and disposing of used paper checks may in the aggregate present a significant cost burden to the financial institution. Further, issuing paper checkbooks, hand drafting paper checks, and processing hand drafted paper checks may in the aggregate entail a significant burden on customers and financial institutions.

Electronic transaction systems provide an alternative payment method that may be more convenient for customers and/or less expensive for financial institutions. At a high level, electronic transaction systems allow a financial institution customer to identify a recipient, define a sum of funds, and authorize a transfer of the sum of funds to the recipient's account. Sometimes electronic transaction systems allow for transactions to occur in the absence of hard copy financial instruments altogether.

SUMMARY

One example embodiment relates to a financial institution computing system. The system includes a data storage system, a network interface logic, a check processing logic, and a payment transaction logic. The data storage system is configured to retrievably store information relating to at least one customer and at least one payee associated with the at least one customer. The network interface logic is configured to enable the financial institution computing system to exchange information over a network. The check processing logic is configured to obtain payee information using a paper check deposit request submitted by a recipient. The payment transaction logic is configured to receive payee information from the check processing logic, create a potential payee, and store the potential payee in the data storage system.

Another example embodiment relates to a method of generating payees from a paper check deposit request as performed by a financial institution computing system. The method includes receiving, by a network interface logic, a paper check deposit request. The method further includes obtaining, by a check processing logic, payee information using the paper check deposit request. The method includes storing, by the payment transaction logic, the potential payee in a data storage system. The method further includes providing, by the payment transaction logic, the potential payee to a customer.

BRIEF DESCRIPTION OF THE DRAWINGS

FIG. 5 is a flowchart of another method of generating payees from a paper check, according to an example embodiment.

DETAILED DESCRIPTION

Figure 1:
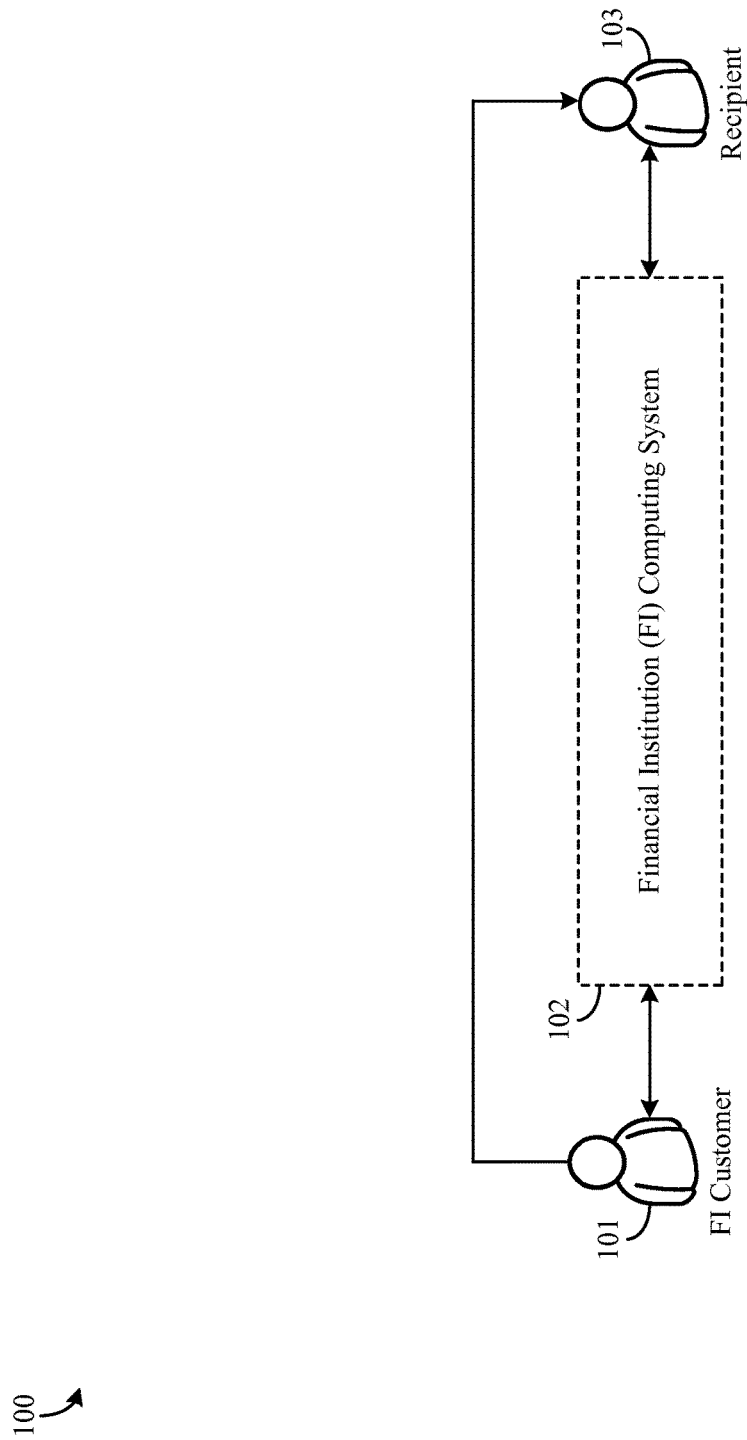
FIG. 1 is a block diagram illustrating a payment transaction system, according to an example embodiment.

Referring to FIG. 1, a payment transaction system 100 includes an FI customer 101, a financial institution computing system 102, and a recipient 103. The financial institution computing system 102 is a computing system at a financial entity that is capable of maintaining customer accounts and processing payment transactions. In the context of the present disclosure, the financial entity can include financial institutions such as commercial or private banks, credit unions, investment brokerages, and so on. The FI customer 101 is a customer of the financial entity, and maintains at least one financial account at the financial institution computing system 102. The recipient 103 is an individual or an entity (e.g., a provider of goods or services) that receives a paper check corresponding to a payment transaction to be debited from a financial account of the FI customer 101. In some arrangements, the recipient 103 is also a customer of the financial entity, but in other arrangements, the recipient 103 is not.

At a high level, the system 100 allows the FI customer 101 to create new payees using information obtained from a paper check. A payee is a set of information used to complete a payment transaction from a financial account of the FI customer 101 to a recipient (e.g., the recipient 103). For example, a bill pay payee corresponding to the recipient 103 may include the name and remittance address of the recipient 103. As another example, a P2P payee may include a telephone number or an email address associated with the recipient 103. Further, where the recipient is a provider of goods or services, a payee may include an account number corresponding to the FI customer 101 (e.g., a customer account number at a cable company). Payees may be organized and stored in data storage systems at the financial institution computing system 102 for present or future use. The use of bill pay payees and P2P payees are discussed in more detail below.

In one arrangement, one or more logics disposed at the financial institution computing system 102 may be configured to receive paper check information (e.g., digital images of the corresponding paper check sent from a recipient financial institution after the recipient 103 deposits the paper check), and extract financial information to generate a new payee (e.g., a bill pay payee or a P2P payee). Text recognition logics (e.g., configured to perform optical character recognition) may allow the financial institution computing system 102 to pull information from a digital image of a paper check, such as the name of the recipient 103. Further, where the recipient 103 is also a customer of the financial entity, the financial institution computing system 102 may be configured to retrieve financial information corresponding to the recipient 103 (e.g., a remittance address, phone numbers, and so on) from its own storage systems to generate a new payee.

In another arrangement, the one or more logics may be configured to electronically transmit information relating to the paper check information (e.g., the digital images themselves, or identifying information extracted from the digital images) back to a recipient financial institution (e.g., a financial institution where the recipient 103 maintains an account, or where the recipient 103 deposited the paper check) or a third party, along with a request for information sufficient to generate a payee corresponding to the recipient 103. In response, the recipient financial institution or the third party may provide the financial institution computing system 102 with the requested information (e.g., a remittance address, phone number, email address, etc.).

In some arrangements, the third party is an entity or a network of entities that facilitate electronic transactions among various financial institutions. In some such arrangements, the third party includes at least one customer information repository, such that the third party is able to electronically circulate specific, limited customer information (e.g., as encrypted or otherwise encoded data) among various financial institutions to facilitate financial transactions. In some arrangements, the third party may exchange customer phone numbers or email addresses among financial institutions to identify parties to electronic transactions and their corresponding financial accounts (i.e., in lieu of actual customer names, financial institution names, account numbers, or other sensitive information). For example, John Doe may initiate a financial transaction to Jane Doe by providing a payment total and Jane Doe's email address to the third party. The third party may recognize Jane Doe's email address as corresponding to Jane Doe's account at Jane Doe's financial institution, and coordinate a payment transaction from John Doe's account to Jane Doe's account.

In addition, customer information may be exchanged as one or more tokens. A token may be a code (e.g., a string of alphanumeric characters) corresponding to sensitive information (e.g., personal customer information, phone numbers, email addresses, customer account numbers, and so on). In other words, a token is associated with sensitive information, as opposed to encrypting or scrambling the sensitive information. In some arrangements, only authorized entities are able to access or determine sensitive information corresponding to a given token (e.g., by looking up a token in a token database cataloging tokens and associated sensitive information). As such, the third party and/or financial institutions may exchange tokens over the course of transactions in lieu of the underlying information itself.

For example, in response to a request for information sufficient to generate a payee for the recipient 103, the recipient financial institution or the third party may provide a payee token. The recipient financial institution or third party may subsequently be able to recognize that payee token corresponds to transaction information for the recipient 103. The financial institution computing system 102 may store the payee token as part of a payee corresponding to the recipient 103, and transmit that payee token to the recipient financial institution or third party in order to complete electronic transactions to the recipient 103.

Payees may be used in various payment transaction services provided by the financial institution computing system 102. Once sufficient financial information to create a payee is provided to the financial institution computing system 102, the financial institution computing system 102 can authorize payment transactions from the FI customer 101 account to the recipient 103 account associated with the payee. For example, the financial institution computing system 102 may be configured to provide a person-to-person ("P2P") payment transaction feature, where transactions are electronically completed. In one such an arrangement, the FI customer 101 can register or identify a P2P payee corresponding to the recipient 103 (e.g., the name of the recipient 103 and a method of electronically contacting the recipient 103) and identify a sum of funds to be transferred (e.g., via a financial entity mobile software application or a website). The financial institution computing system 102 may then electronically contact the recipient 103 (e.g., via email or through a mobile device), and invite the recipient 103 to participate in the P2P payment transaction feature. In some arrangements where a third party customer information repository is available (e.g., where customers and customer accounts may be identified with an email address or phone number), the recipient 103 may consent to the use of the P2P payment transaction feature to participate in electronic transactions. In some arrangements where the third party customer information repository is not available, the recipient 103 may be prompted to provide additional financial information sufficient to complete a payment transaction (e.g., a financial entity where the recipient 103 maintains a financial account, and a corresponding account number). A P2P payee for the recipient 103 may then be stored at the financial institution computing system 102 and P2P transactions with the recipient 103 may be completed.

As another example, the financial institution computing system 102 may be configured to provide a bill pay feature, where payment transactions are completed via paper checks. In one such arrangement, the FI customer 101 can register or identify a bill pay payee corresponding to the recipient 103 (e.g., the name of the recipient 103 and a corresponding remittance address) and a sum of funds to be transferred (e.g., in a similar manner as the P2P feature). The financial institution computing system 102 may then cause a paper check to be made out and sent to the recipient 103 directly from the financial institution (e.g., the financial institution drafts and sends the paper check, as opposed to the FI customer 101).

In operation, the FI customer 101 provides a paper check to the recipient 103 (e.g., by drafting a paper check and physically handing the paper check to the recipient 103). The recipient 103 deposits the paper check into a financial account at the recipient financial institution (e.g., via a financial entity mobile device application, or at a financial entity brick and mortar facility). The financial institution computing system 102 then receives information relating to the paper check (e.g., digital images of the paper check, or financial information digitally extracted from the paper check) from the recipient financial institution. In one arrangement, the financial institution computing system 102 uses the check information to populate at least some information needed to create a new payee corresponding to the recipient 103, and in some such arrangements, notifies the FI customer 101 (e.g., via text, email, a popup notification, or the like) that a new payee corresponding to the recipient 103 can be made. The FI customer 101 can view (and supplement, if appropriate) the new payee corresponding to the recipient 103 (e.g., via a financial entity mobile application or website). In another arrangement, the financial institution computing system 102 sends the check information back to the recipient financial institution or a third party, and request payee information corresponding to the recipient 103. The recipient financial institution or the third party returns payee information (e.g., as an encrypted data transmission or a token) to the financial institution computing system 102, where it is stored as a new payee. The FI customer 101 may then complete subsequent payment transactions to the recipient 103 by selecting the new payee corresponding to the recipient 103 and using a P2P or bill pay feature. Additional functions and features of the system 100 are discussed with respect to FIG. 2, below.

Figure 2:
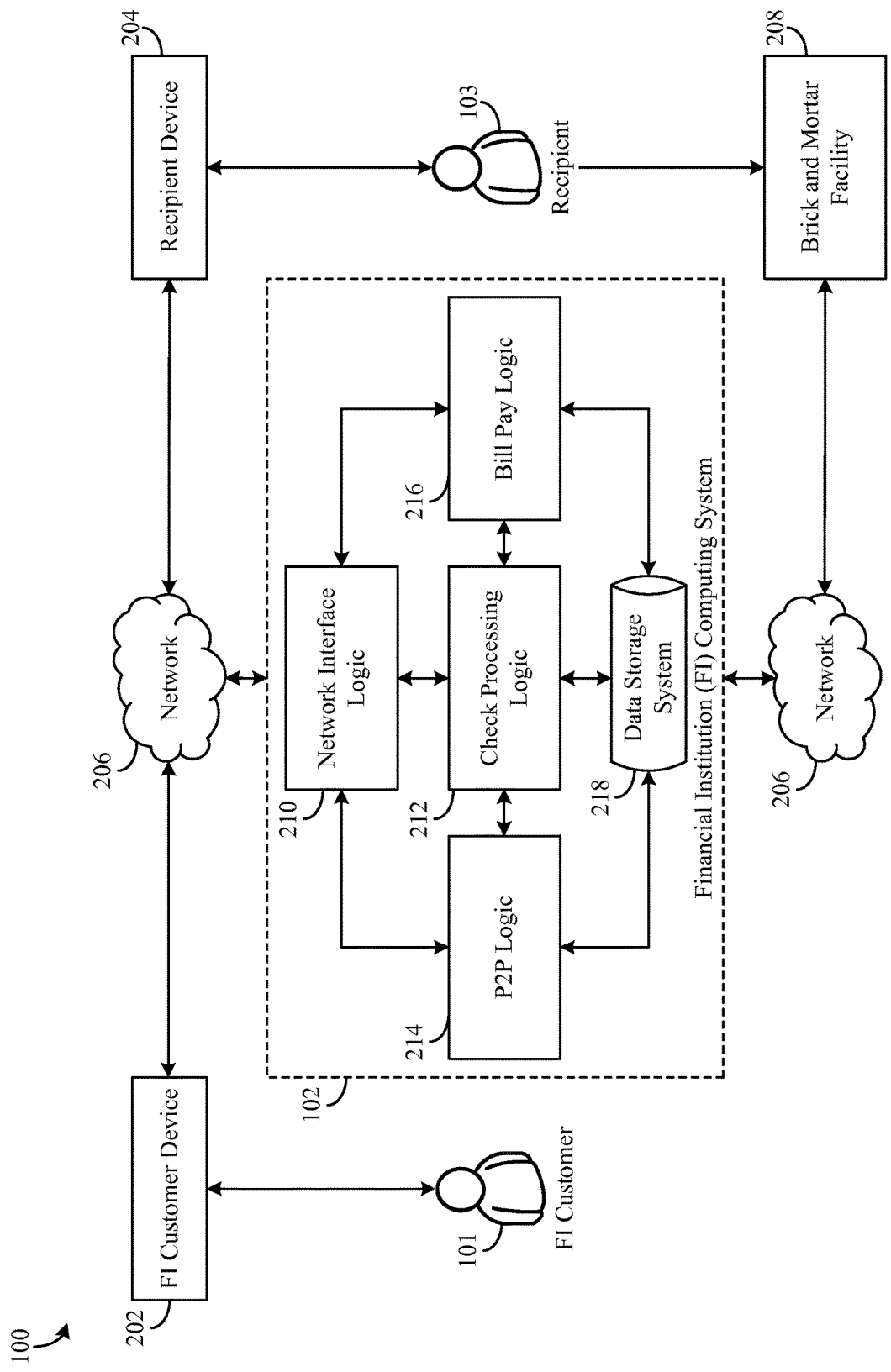
FIG. 2 is a block diagram illustrating additional features of the payment transaction system shown in FIG. 1.

Referring now to FIG. 2, the system 100 may further include a FI customer device 202, a recipient device 204, and a network 206. The FI customer device 202 and the recipient device 204 are computing systems associated with the FI customer 101 and the recipient 103, respectively. Both the FI customer device 202 and the recipient device 204 include one or more processors and non-transitory storage mediums housing one or more logics configured to allow each device to exchange data over the network 206, execute software applications, access websites, generate graphical user interfaces, and perform other similar functionalities. Examples of the FI customer device 202 and the recipient device 204 include laptop computers, desktop computers, tablets, smartphones, wearable computing devices such as eyewear, and the like. The network 206 is a data exchange medium communicatively engaged to the FI customer device 202, the recipient device 204, and the financial institution computing system 102, and may include wireless networks (e.g., cellular networks, Bluetooth®, WiFi, Zigbee®, etc.), wired networks (e.g., Ethernet, DSL, cable, fiber-based, etc.), or a combination thereof. In some arrangements, the network 206 includes the internet.

In some arrangements, one or both of the FI customer device 202 and the recipient device 204 includes an FI circuit, which may include program logic executable by the device to implement at least some of the functions described herein. For example, in order to make the FI circuit, a provider (e.g., a software developer or publisher, or the financial entity itself) can make a software application available to be placed on the FI customer device 202. A software developer may make the software application available to be downloaded (e.g., via the developer's website, via an app store, or in another manner). Responsive to a user selection of an appropriate link, the software application can be transmitted to the FI customer device 202 and cause itself to be installed on the FI customer device 202. Installation of the software application creates the FI circuit on the FI customer device 202. Specifically, after installation, the thus-modified FI customer device 202 includes the FI circuit (e.g., embodied as a processor and instructions stored in non-transitory memory that are executed by the processor). In other arrangements, the FI circuit can be a portal to a computing system configured to perform the operations discussed with respect to the FI circuit, which may be made available to the FI customer device 202 or the recipient device 204 (e.g., a website).

In some arrangements, the system 100 further includes a brick and mortar facility 208. The brick and mortar facility 208 is a physical establishment operated by a financial entity that may or may not be associated with the financial institution computing system 102. In some arrangements, the brick and mortar facility 208 houses the financial institution computing system 102. In other arrangements, the brick and mortar facility 208 includes its own computing system, complete with processing, storage, and logics configured to participate in the system 100 in the manner discussed herein. In some such arrangements, the brick and mortar facility 208 includes one or more logics enabling it to exchange information over the network 206. The brick and mortar facility 208 provides a physical location where individuals (e.g., the recipient 103) may go to and perform various financial transactions (e.g., depositing a paper check, opening new financial accounts, and so on).

The financial institution computing system 102 includes a network interface logic 210, a check processing logic 212, at least one payment transaction logic, and a data storage system 218. The network interface logic 210 is configured to allow the financial institution computing system 102 and various components thereof to exchange data over the network 206 (e.g., to and from the FI customer device 202, the recipient device 204, and/or the brick and mortar facility 208).

The check processing logic 212 receives and processes check information from a check deposit request received at the network interface logic 210. A check deposit request is a request to debit funds from a customer's account at the financial institution computing system 102 (e.g., an account owned by the FI customer 101) and transfer those funds to an account associated with a recipient (e.g., an account associated with the recipient 103) or authorize a release of a sum of cash to the recipient, according to the terms of a paper check. In some arrangements, the check processing logic 212 is configured to transmit a request for information sufficient to create payee back to the recipient financial institution or a third party. In some such arrangements, the check processing logic 212 can receive a payee token or the requested information in response.

Alternatively, in some arrangements, the check processing logic 212 is configured to extract financial information (e.g., recipient name, drafter name, account numbers, etc. as printed on the paper check or written in a memo line or an endorsement via optical character recognition, or other similar technologies) from images of a paper check included in the check deposit request. The check processing logic 212 may also be configured to recognize financial information in the check deposit request (e.g., where one or more logics independent from the financial institution computing system 102 performed a data extraction procedure such as OCR on one or more paper check images and provided the resulting financial information to the financial institution computing system 102). Further, in some arrangements, the check processing logic 212 may be configured to use the extracted or recognized financial information in conjunction with information in the data storage system 218 to determine whether the recipient maintains any accounts at the financial institution computing system 102. Upon extracting or recognizing financial information corresponding to a paper check, the check processing logic 212 may be configured to forward the financial information to a payment transaction logic and/or the data storage system 218. In addition, the check processing logic 212 may be configured to process and execute a payment transaction corresponding to a paper check (e.g., authorizing a transfer of funds from an account of the FI customer 101 to an account of the recipient 103 or authorizing a cash transaction).

In some arrangements, the payment transaction logic may include a P2P logic 214. The P2P logic 214 is configured to enable the P2P feature discussed above with respect to FIG. 1. In a first aspect, the P2P logic 214 may be configured to collect information sufficient to create P2P payees (e.g., names and corresponding email addresses and/or telephone numbers) and store P2P payees in the data storage system 218. The P2P logic 214 may receive some or all of the information to create a potential P2P payee from financial information extracted or recognized by the check processing logic 212, as tokens or encrypted information from a third party or a recipient financial institution, or directly from the FI customer 101 (e.g., as entered into the FI customer device 202, transmitted across the network 206, and received at the network interface logic 210). In some arrangements, the P2P logic 214 is further configured to notify the FI customer 101 that a new P2P payee may be available or additional information may be needed to complete a new P2P payee (e.g., by causing a corresponding text message, email, popup notification, or the like to be received at the FI customer device 202). In some such arrangements, the P2P logic 214 is configured to notify the FI customer 101 of a potential new P2P payee after a minimum number of paper checks directed to the same recipient is processed at the check processing logic 212 (e.g., where the check processing logic 212 has processed at least three paper checks to the recipient 103). Further, the P2P logic 214 may be configured to detect a consistent payment amount and/or a consistent payment interval in the processed paper checks, and offer a corresponding P2P auto-pay function to the FI customer 101. The auto-pay function causes P2P payment transactions of a set amount to issue at set intervals (e.g., monthly $50.00 payments).

In a second aspect, the P2P logic 214 may also be configured to collect information sufficient to generate profiles for P2P payment recipients (e.g., the recipient 103), and store the profiles in the data storage system 218. The profiles may include, for example, a recipient name, a recipient financial entity, and a recipient account number. The information for the profiles can be collected from, for example, data transmissions from the recipient device 204 (e.g., as directly entered by the recipient 103, where the recipient 103 registers for a P2P pay feature), or in arrangements where the recipient is also a customer of the financial entity associated with the financial institution computing system 102, from the data storage system 218. In some arrangements, the P2P logic 214 may be configured to determine whether a new profile corresponds to a recipient of a customer's paper check, and notify the customer that the recipient established a profile and may receive P2P payments. In some arrangements, the P2P logic 214 is configured to use the profiles to automatically generate potential P2P payees.

In a third aspect, the P2P logic 214 may be further configured to guide recipients through a registration process for the P2P transaction feature. For example, the P2P logic 214 may invite a given recipient to register for the P2P transaction feature (e.g., by providing information sufficient to generate a P2P payment profile). The P2P logic 214 may provide the recipient with information relating to the benefits of electronic payment transactions such as P2P transactions (e.g., faster payment transactions, reduced paper consumption, etc.), along with instructions for generating a P2P payment profile. For example, the P2P logic 214 may request a recipient name, a recipient financial entity, and a recipient account number to generate a P2P payment profile. The P2P logic 214 may also request additional information such as a recipient email address and/or a recipient phone number. Upon completing a P2P payment profile, the recipient may create their own P2P payees and authorize their own electronic transactions.

In a fourth aspect, the P2P logic 214 may be configured to execute a P2P payment transaction. For example, the FI customer 101 may use the FI customer device 202 to identify the recipient 103, and transmit a P2P transaction request to the financial institution computing system 102 via the network 206. The network interface logic 210 may then route the request to the P2P logic 214. Where a P2P payee corresponding to the recipient 103 exists in the data storage system 218, the P2P logic 214 may be configured to use the P2P payee to execute the P2P transaction request. Where the P2P payee does not exist in the data storage system 218, the P2P logic 214 may be configured to send an electronic invitation to the recipient 103 (e.g., to the recipient device 204 over the network 206) to provide information sufficient to generate a new P2P payee, and then use the new P2P payee to execute the P2P transaction request.

In some arrangements, the payment transaction logic includes a bill pay logic 216. The bill pay logic 216 is configured to enable the bill pay feature discussed above with respect to FIG. 1. Similar to the first aspect of the P2P logic 214, a first aspect of the bill pay logic 216 includes collecting information sufficient to create bill pay payees and store the bill pay payees in the data storage system 218. Bill pay payee information may be collected all or in part from the operation of the check processing logic 212, or data transmissions from the FI customer device 202 (e.g., where the FI customer 101 enters bill pay payee information directly into the FI customer device 202 and transmits the information to the financial institution computing system 102 over the network 206). In some arrangements, the bill pay logic 216 is configured to notify the FI customer 101 (e.g., through the FI customer device 202) that a new bill pay payee may be available or that additional information is needed to complete a new bill pay payee. In some such arrangements, the bill pay logic 216 is configured to notify the FI customer 101 after the check processing logic 212 has processed a minimum number of checks to the same recipient (e.g., five paper checks directed to the recipient 103). Further, the bill pay logic 216 may be configured to detect a consistent payment amount and/or a consistent payment interval in the processed paper checks, and offer a corresponding bill pay auto-pay function to the FI customer 101 (e.g., biweekly $300.00 bill pay payments).

In a second aspect, the bill pay logic 216 may be configured to issue a paper check to a bill pay payee. For example, where a bill pay payee corresponding to the recipient 103 exists in the data storage system 218, the FI customer 101 may use the FI customer device 202 to select the bill pay payee, identify a sum of funds to be transferred to the recipient 103, and transmit a bill pay request to the financial institution computing system 102. The bill pay logic 216 may receive the bill pay request through the network interface logic 210, and use the bill pay payee in the data storage system 218 to cause a corresponding paper check to issue to the remittance address in the bill pay payee. In some arrangements, the bill pay logic 216 causes the corresponding paper check to be delivered to a secured location or facility associated with the recipient 103 (e.g., a locked mailbox, a secured drop box, etc.). Information relating to the secured location or facility may be included in the corresponding bill pay payee.

The data storage system 218 allows the financial institution computing system 102 to retrievably store information relating to the various operations discussed herein, and may include non-transient data storage mediums (e.g., local disc or flash-based hard drives, local network servers, and the like) or remote data storage facilities (e.g., cloud servers). The data storage system 218 may store information such as complete or incomplete P2P or bill pay payees, personal customer information (e.g., names, addresses, phone numbers, and so on), and customer financial information (e.g., account numbers, account balances, available credit, credit history, and so on). Information at the data storage system 218 may be stored and/or retrieved by various logics disposed at the financial institution computing system 102.

In operation, according to one example, the FI customer 101 drafts and delivers a paper check for $100.00 to the recipient 103 once a month for five months. Using an FI circuit on the recipient device 204, the recipient 103 deposits each paper check in the same month a paper check is received. During each deposit, the network interface logic 210 receives an image of the front side of a paper check and an image of a back side of the paper check, and forwards the images to the check processing logic 212. The check processing logic 212 extracts financial information from the images, forwards extracted financial information to the P2P logic 214 and the bill pay logic 216, and executes a transaction of $100.00 from a FI customer 101 account to a recipient 103 account. Each of the P2P logic 214 and the bill pay logic 216 accesses the data storage system 218 to determine whether the recipient 103 is associated with any P2P payees or bill pay payees, respectively. Finding that the recipient 103 is not associated with any payees, each of the P2P logic 214 and the bill pay logic 216 uses information extracted by the check processing logic 212 and/or information in the data storage system 218 (e.g., where the recipient 103 maintains an account at the financial institution computing system 102) to generate at least part of a new P2P payee and a new bill pay payee. After the check processing logic 212 processes the fifth paper check deposit, at least one of the P2P logic 214 and the bill pay logic 216 causes a new payee notification to occur at the FI customer device 202 (e.g., over the network 206 via the network interface logic 210). The new payee notification informs the FI customer 101 that a new payee (e.g., a P2P payee and/or a bill pay payee) corresponding to the recipient 103 is available. Where payee some information is missing, the new payee notification may inform the FI customer 101 that additional information may need to be provided. In addition, the new payee notification may include an offer to set up an auto pay feature for monthly payments of $100.00 to the recipient 103 via P2P or bill pay transactions.

In operation according to another example, the FI customer 101 drafts and delivers a paper check for $200.00 to the recipient 103 once a month for three months, wherein the recipient 103 does not maintain any accounts at the financial entity associated with the financial institution computing system 102. In each of the three months, the recipient 103 cashes a paper check at the brick and mortar facility 208, which is associated with the financial institution computing system 102. For each of the first two times the recipient 103 cashes a paper check at the brick and mortar facility 208, a teller at the brick and mortar facility 208 receives each paper check, causes a corresponding check deposit request to be transmitted to the financial institution computing system 102, and provides the recipient 103 with $200.00 in cash. Images of each paper check are included in the check deposit requests transmitted from the brick and mortar facility 208 to the financial institution computing system 102 over the network 206, which are processed in the same manner as discussed in the example provided immediately above.

However, in the present example, when the recipient 103 cashes the third paper check at the brick and mortar facility 208, the check processing logic 212 at the financial institution computing system 102 notifies the teller that the recipient 103 does not maintain any accounts at the financial institution computing system 102. For example, in one arrangement, the check processing logic 212 receives images corresponding to the third paper check, recognizes the name of the recipient 103 as an individual with no accounts at the financial institution computing system 102, and transmits a corresponding notification back to the teller at the brick and mortar facility 208 while the recipient 103 is still present. The notification can inform the teller that the recipient 103 had previously cashed two paper checks each of which debited $200.00 from the same FI customer 101 account. As such, the teller may provide the recipient 103 with an offer to open a new account at the financial institution computing system 102 in order to facilitate future transactions with the FI customer 101. If the recipient 103 agrees, the teller can transmit a new account request to the financial institution computing system 102, and deposit at least part of the value of the latest paper check into the new account.

Figure 3A:
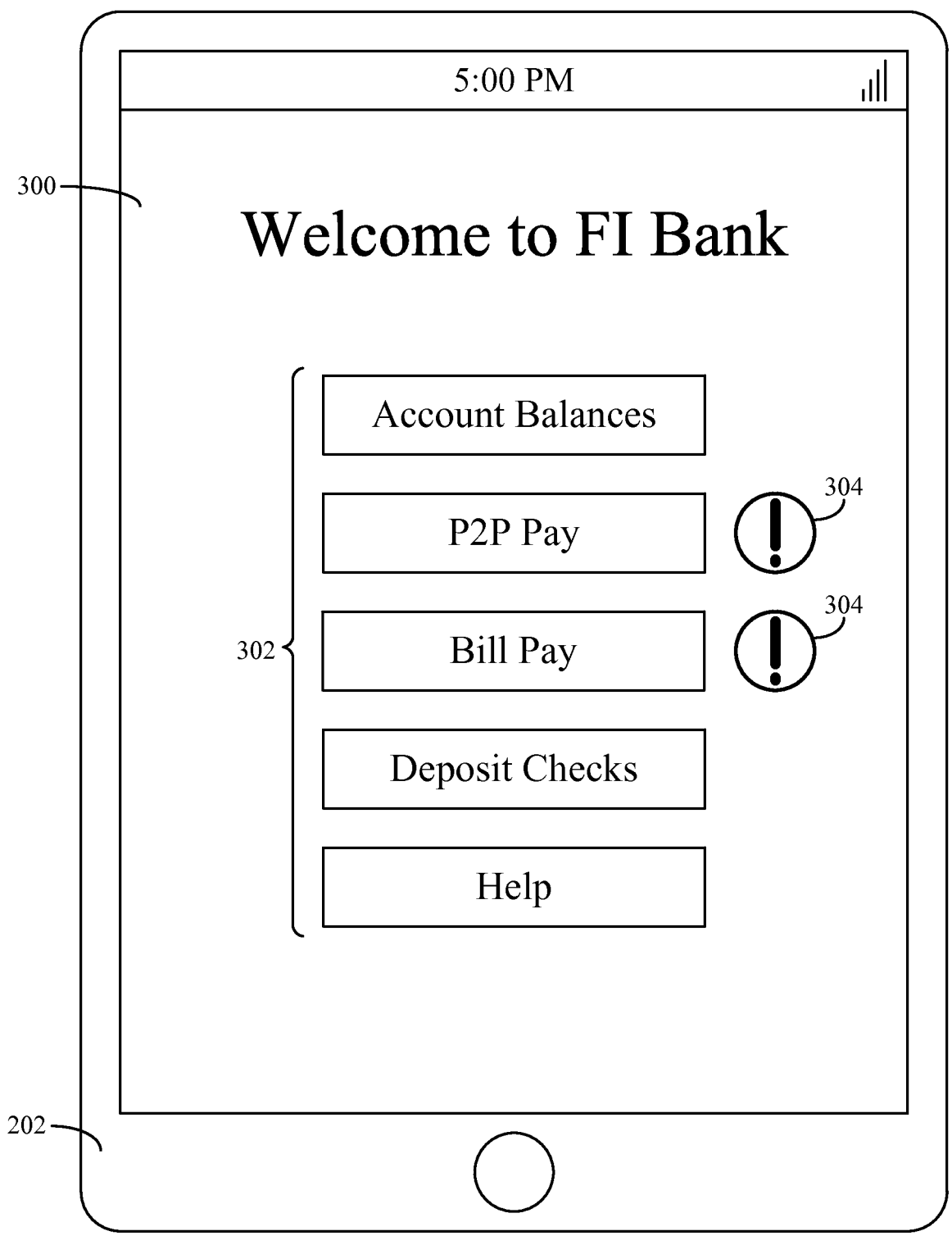
FIGS. 3A-3C are depictions of various screens generated on a user interface, which may be used to facilitate a payment transaction, according to example embodiments.

Referring now to FIG. 3A, a graphical user interface 300 as generated by a FI circuit disposed in the FI customer device 202 is shown as a welcome screen. The graphical user interface 300 provides a medium through which a customer can register payees and authorize payment transactions, among other operations. Further, the graphical user interface 300 allows a user (e.g., FI customer 101) to view and interpret information provided by the financial institution computing system 102. In some arrangements, the graphical user interface 300 is provided by a remote server as a website. In other arrangements, the graphical user interface 300 is provided by a FI circuit. The welcome screen includes a menu 302 comprising a plurality of user-interactive buttons, which here, includes buttons corresponding to an account balances function, a P2P pay function, a bill pay function, a deposit checks function, and a help function. In some arrangements, the graphical user interface 300 further includes one or more alert symbols 304, which here, are disposed adjacent to buttons of the menu 302 corresponding to the P2P pay feature and the bill pay feature. The alert symbols 304 may be configured to indicate to a user that new or potential payees (e.g., P2P payees or bill pay payees) may be available.

Figure 3B:
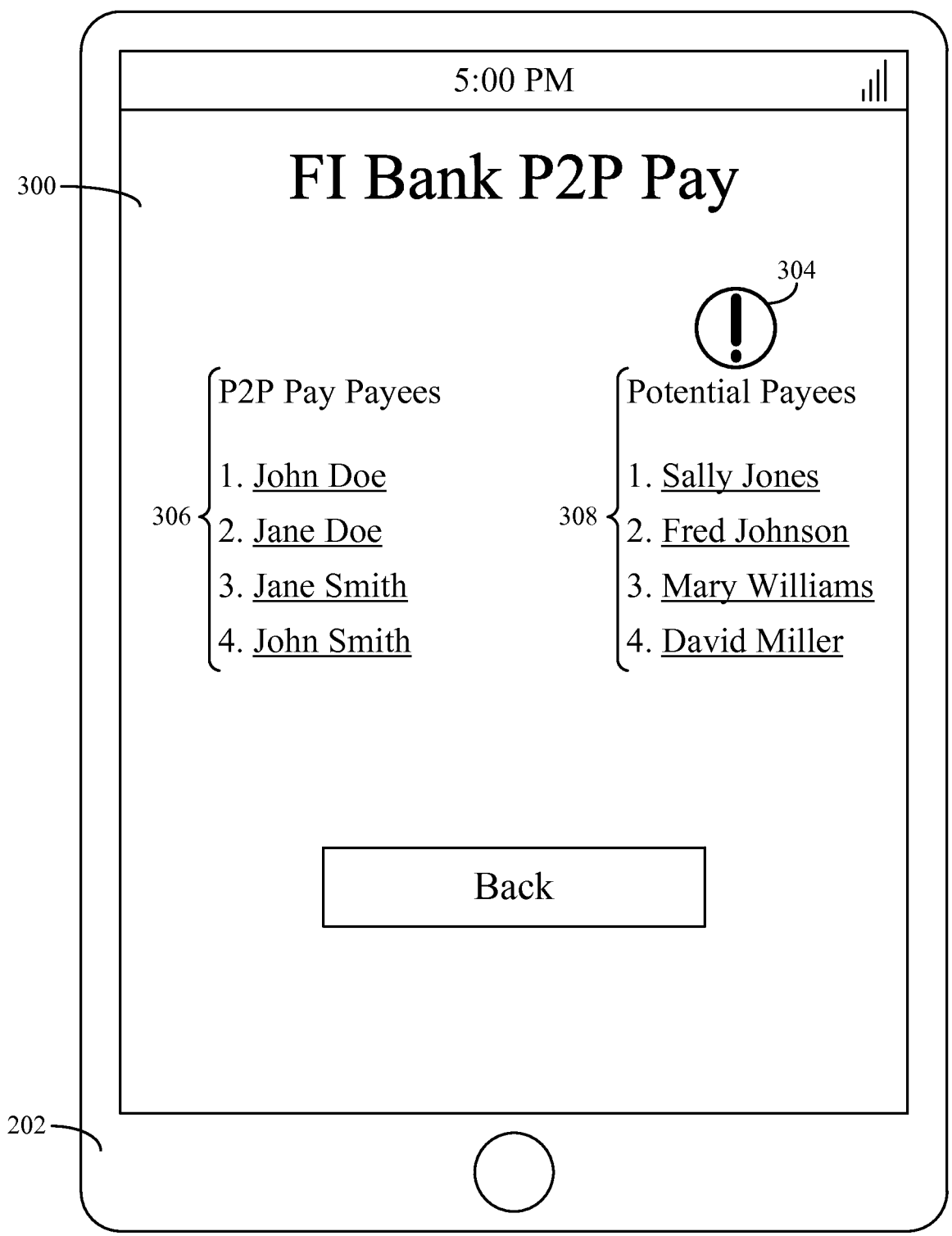

Referring now to FIG. 3B, the graphical user interface 300 has refreshed in response to a user selection of a button in the menu 302 corresponding to a P2P pay feature to show a P2P pay screen. The P2P pay screen includes a list of P2P pay payees 306 that a user has already registered, and a list of potential payees 308. In one arrangement, the list of potential payees 308 includes potential P2P payees that the P2P logic 214 has generated from paper check information processed by the check processing logic 212. In some such arrangements, the list of potential payees 308 includes complete P2P payees (e.g., where one or more P2P payees correspond to other customers maintaining accounts at the financial institution computing system 102, where a recipient 103 registers to use a P2P payment transaction system prior to the customer 101 setting up a corresponding P2P payee, or where P2P payee information is provided by a recipient financial institution or a third party). In some such arrangements, the list of potential payees 308 includes incomplete P2P payees (e.g., where only recipient names were extracted from paper check images processed by the paper check processing logic 212, and wherein those individuals do not maintain accounts at the financial institution computing system 102). In some arrangements, the list of potential payees 308 includes a plurality of names, wherein each name in the list of potential payees 308 are user-selectable links, which may cause the graphical user interface 300 to provide the user with the potential payee corresponding to a selected name.

Figure 3C:
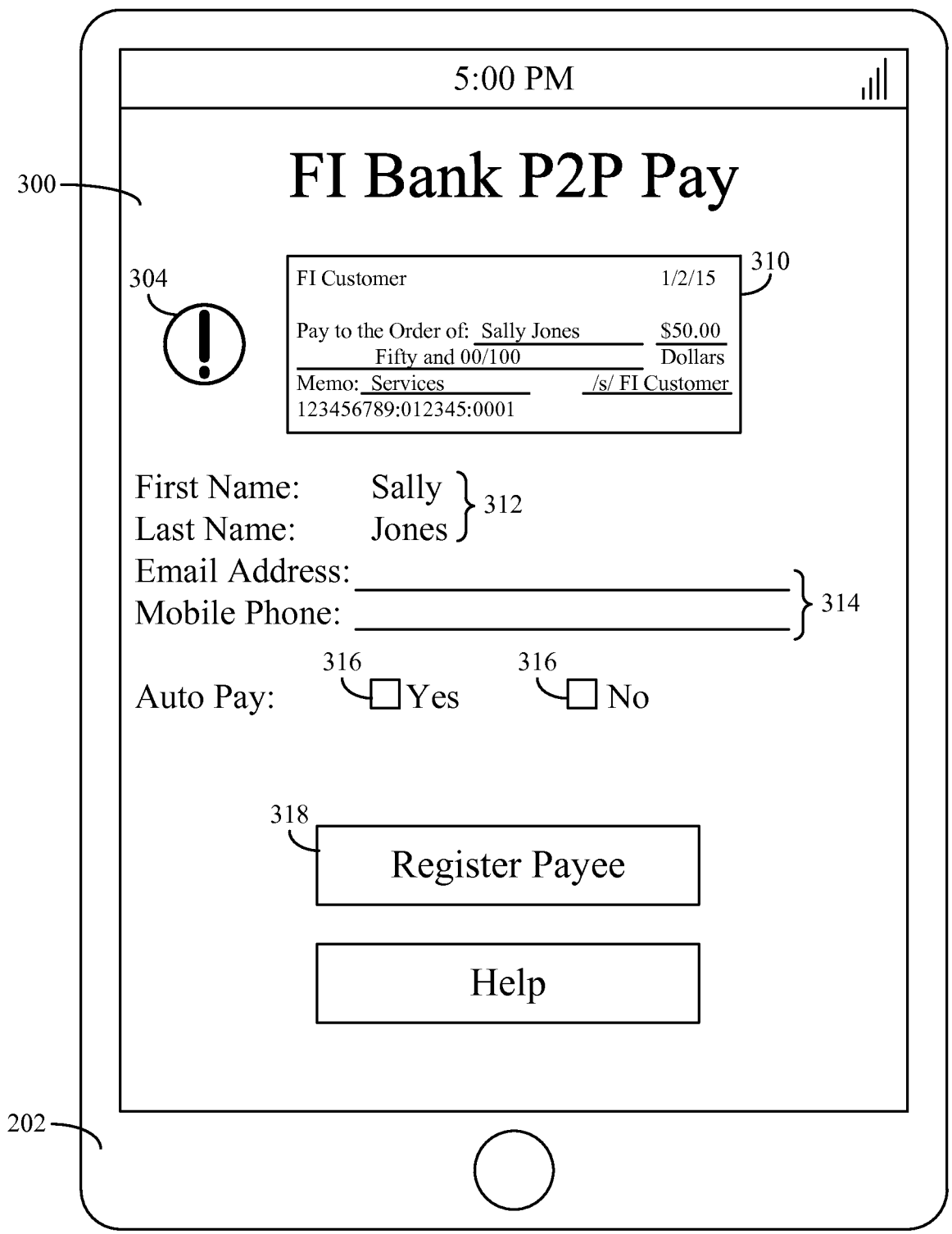

Referring now to FIG. 3C, in response to a user selection of a link in the list of potential payees 308 corresponding to an individual named Sally Jones, the graphical user interface 300 has refreshed to show a P2P payee registration page. The P2P payee registration page includes at least one pre-populated field 312 corresponding to P2P payee information (e.g., information provided by the check processing logic 212 to the P2P logic 214, such as a recipient first name and last name, or information provided by a third party or a recipient financial institution) and in some arrangements, one or more empty fields 314 corresponding to missing P2P payee information. The graphical user interface 300 may be configured to allow a user to manually fill in information into the empty fields 314 (e.g., via a touchscreen or analog keyboard) in order to complete a new P2P payee. Upon entering information into one or more of the empty fields 314, a user may select a register payee button 318 provided by the graphical user interface 300 to cause a corresponding new P2P payee (e.g., corresponding to Sally Jones) to be stored in the data storage system 218.

In some arrangements, the P2P payee registration page includes a paper check image 310. The paper check image 310 may be a copy of the most recent front-side paper check image received at the financial institution computing system 102 that was provided by a recipient (e.g., Sally Jones). The paper check image 310 may provide a user with a reminder as to the last paper check delivered to the recipient 103 (e.g., the amount, date, and memo, if any, of the last paper check).

In addition, in some arrangements, the P2P payee registration page includes one or more toggles 316 corresponding to an option to enable an auto pay function directed to the new P2P payee recipient. In some such arrangements, the amount and frequency of the auto pay function may be pre-set based on the user's previous transaction activities with the recipient (e.g., where the P2P logic 214 is configured to detect a common paper check amount and/or frequency for a given recipient, the P2P logic 214 can provide those values to the FI customer device 202). The user may select a toggle corresponding to an auto pay feature preference (e.g., to activate or not to activate) before selecting the register payee button 318. If the user elects to activate an auto pay function, the graphical user interface 300 may be configured to present the user with interactive fields to adjust the value and frequency of each auto pay transactions.

Figure 4:
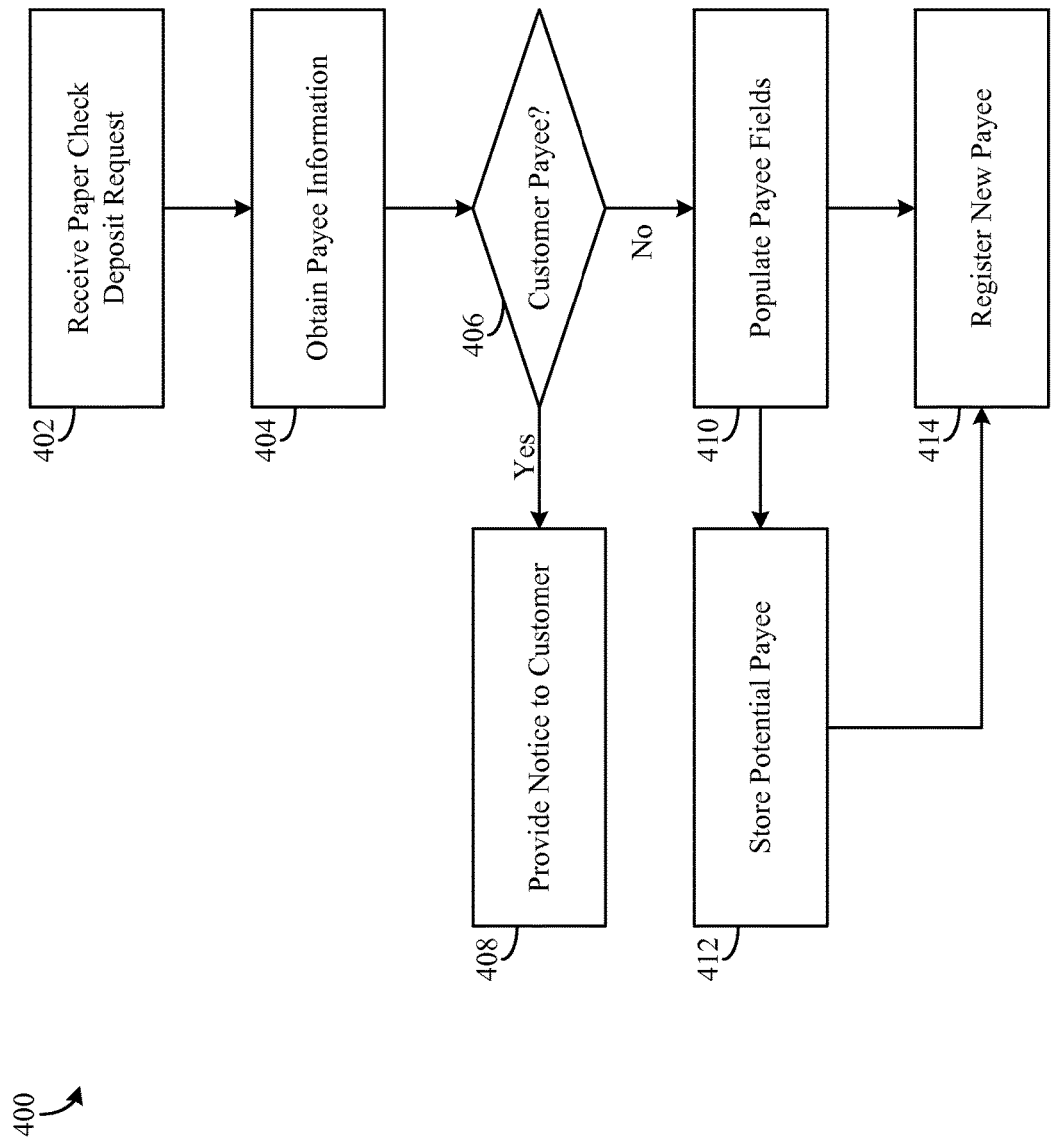
FIG. 4 is a flowchart of a method of generating payees from a paper check, according to an example embodiment.

Referring now to FIG. 4, a method 400 of registering a new payee is shown. The method 400 is performed by processing and storage hardware at a financial institution computing system (e.g., financial institution computing system 102), as executed by one or more logics configured to perform the functions described below.

At 402, paper check information is received. The paper check information is received at a financial institution computing system (e.g., the financial institution computing system 102). In some arrangements, the paper check information is received as one or more digital images of a front side of the paper check and a back side of the paper check. In other arrangements, the paper check information is received as pre-processed paper check data (e.g., digital information corresponding to the drafter's name, the recipient's name, the drafter's account number, the payment amount, etc.). The paper check information may be received by a network interface logic (e.g., the network interface logic 210) from a remote computing system (e.g., the FI customer device 202, the recipient device, the brick and mortar facility 208, and the like). The paper check information may also be received directly at the financial institution computing system, for example where the financial institution computing system is disposed at a brick and mortar facility (e.g., the brick and mortar facility 208), and the paper check is deposited at the brick and mortar facility. In some arrangements, the paper check information is forwarded to a check processing logic (e.g., the check processing logic 212) upon being received.

At 404, payee information (e.g., the recipient's name, phone number, email address, account information, etc.) is obtained. The payee information may be obtained from a paper check received at the financial institution computing system (e.g., as received at 402). In some arrangements, a check processing logic (e.g., the check processing logic 212) is configured to extract payee information by performing a character recognition process on paper check images (e.g., via optical character recognition, or similar technologies). In other arrangements, the check processing logic is configured to recognize various types of paper check data received (e.g., where the paper check is received as pre-processed paper check data). The payee information may also be obtained from a recipient financial institution or a third party in response to an information request, and may be obtained as encrypted data or one or more tokens.

At 406, whether a paper check recipient corresponds to a customer payee is determined. In some arrangements, payees are stored in a data storage system (e.g., the data storage system 218) at the financial institution computing system. One or more logics configured to prepare and execute payment transactions (e.g., the P2P logic 214 and the bill pay logic 216) may also be configured to use payee information obtained at 404 to look up the customer in the data storage system and determine whether the paper check recipient is included in any of the customer's payees. For example, a customer may have previously registered a payee corresponding to the recipient, but subsequently drafted another paper check to the recipient. As another example, the customer may have previously drafted a paper check to the recipient, and the financial institution computing system generated a potential payee corresponding to the recipient and stored the potential payee in the data storage system (e.g., a complete payee or an incomplete payee, as discussed with respect to 410 and 412, below). As yet another example, where payment transaction method includes a registration by the recipient (e.g., in a P2P payment transaction), a potential payee may be generated after the recipient registers to use the payment transaction method.

At 408, a notice that a payee or a potential payee corresponding to a paper check recipient exists at the financial institution computing system is provided to a customer. One or more logics configured to prepare and execute payment transactions (e.g., the P2P logic 214 and the bill pay logic 216) may also be configured to notify a customer that a paper check received at the financial institution computing system was drafted to one of the customer's existing payees. In some arrangements, the one or more logics are configured to notify the customer after a threshold number of paper checks drafted to the same recipient have been processed at the financial institution computing system before notifying the customer of the existence of a corresponding payee. The one or more logics may be configured to notify the customer via any of several digital communication methods, such as email, a popup notice on a graphical user interface, an application-specific message (e.g., an account "inbox" in a financial institution graphical user interface), an SMS message, and so on.

At 410, payee fields are populated for a new payee. One or more logics configured to prepare and execute payment transactions (e.g., the P2P logic 214 and the bill pay logic 216) may also be configured to create a new payee or a new potential payee by using extracted paper check data (e.g., as extracted at 404) to populate at least one payee field (e.g., a payee name). As a result of populating at least one payee field, a new potential payee may be generated.

At 412, a potential payee is stored. In one arrangement, a potential payee is a complete (e.g., contains all information to complete a payment transaction) or incomplete (e.g., is missing one or more pieces of information used in completing a payment transaction) payee that was generated using payee information, but has not yet been viewed, registered, or used by a corresponding customer. The potential payee may be stored in a data storage system (e.g., the data storage system 218) by one or more logics configured to prepare and execute payment transactions (e.g., the P2P logic 214 and the bill pay logic 216).

At 414, a new payee is registered. A new payee populated by one or more logics configured to prepare and execute payment transactions (e.g., the P2P logic 214 and the bill pay logic 216) may be registered by receiving an input from the customer (e.g., the FI customer 101) corresponding to an approval of the new payee. For example, the customer may use a customer device (e.g., the FI customer device 202) to view a new payee, provide additional or missing payee information, and confirm that the customer wishes to use the new payee. In some arrangements, the customer input may include a payment transaction request directed to the new payee.

Referring now to FIG. 5, a second method 500 of registering a new payee is shown. The second method 500 is performed by processing and storage hardware at a financial institution computing system (e.g., financial institution computing system 102), as executed by one or more logics configured to perform the functions described below.

At 502, a plurality of paper check deposit requests are received. Each of the plurality of paper check deposit requests are received at a financial institution computing system (e.g., the financial institution computing system 102), for example similar to the manner discussed above with respect to 402 of FIG. 4. The plurality of paper check deposit requests may be received over the life of a customer account at a financial institution.

At 504, a plurality of potential payees are stored. Each of the plurality of potential payees may be created and stored similar to the manner discussed above with respect to 402, 404, 406, 410, and 412 of FIG. 4. In some arrangements, the plurality of payees correspond to recipients associated with the plurality of paper check deposit requests received. As such, the plurality of potential payees include individuals and entities that a financial institution customer has paid via a paper check, but who are not yet payees.

At 506, a transaction history is provided. The transaction history may be provided by a payment logic (e.g., the P2P logic 214 or the bill pay logic 216, retrieving transaction data from the data storage system 218), and may include an itemized listing of deposits and debits to a particular customer account at the financial institution. In some arrangements, the transaction history may be provided via a customer device (e.g., the FI customer device 202) over a network (e.g., the network 206). For example, the transaction history may include debit entries corresponding to the plurality of paper check deposit requests received at 502. The debit entries may include a recipient name, a debit amount, and a transaction date.

At 508, notice of potential payees are provided to the customer. The payment logic may be configured to include notifications in the transaction history that potential payees are available for certain parties to previous transactions. For example, where a potential payee was created and stored based on a previous paper check deposit request, the payment logic can provide a visual notice adjacent to a transaction listing corresponding to that paper check deposit request. In some arrangements, the visual notice may include an icon or symbol along with a note (e.g., an exclamation point and an "Add to P2P Pay" note). Further, visual notices may be provided adjacent to each transaction listing that is associated with a potential payee.

At 510, a new payee is registered. The new payee may be registered similar to the manner discussed above with respect to 414 of FIG. 4. The new payee may be registered in response to a user input based on the visual notice provided at 508 (e.g., where the visual notice is an interactive button or link to a registration function).

The scope of this disclosure should be determined by the claims, their legal equivalents and the fact that it fully encompasses other embodiments which may become apparent to those skilled in the art. All structural, electrical and functional equivalents to the elements of the below-described disclosure that are known to those of ordinary skill in the art are expressly incorporated herein by reference and are intended to be encompassed by the present claims. A reference to an element in the singular is not intended to mean one and only one, unless explicitly so stated, but rather it should be construed to mean at least one. No claim element herein is to be construed under the provisions of 35 U.S.C. § 112, sixth paragraph, unless the element is expressly recited using the phrase "means for." Furthermore, no element, component or method step in the present disclosure is intended to be dedicated to the public, regardless of whether the element, component or method step is explicitly recited in the claims.

The embodiments in the present disclosure have been described with reference to drawings. The drawings illustrate certain details of specific embodiments that implement the systems, methods and programs of the present disclosure. However, describing the embodiments with drawings should not be construed as imposing any limitations that may be present in the drawings. The present disclosure contemplates methods, systems and program products on any machine-readable media for accomplishing its operations. The embodiments of the present disclosure may be implemented using an existing computer processor, or by a special purpose computer processor incorporated for this or another purpose or by a hardwired system.

As noted above, embodiments within the scope of the present invention include program products comprising non-transitory machine-readable media for carrying or having machine-executable instructions or data structures stored thereon. Such machine-readable media may be any available media that may be accessed by a general purpose or special purpose computer or other machine with a processor. By way of example, such machine-readable media may comprise RAM, ROM, EPROM, EEPROM, CD-ROM or other optical disk storage, magnetic disk storage or other magnetic storage devices, or any other medium which may be used to carry or store desired program code in the form of machine-executable instructions or data structures and which may be accessed by a general purpose or special purpose computer or other machine with a processor. Thus, any such a connection is properly termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

Embodiments in the present disclosure have been described in the general context of method steps which may be implemented in one embodiment by a program product including machine-executable instructions, such as program code, for example, in the form of program modules executed by machines in networked environments. Generally, program modules include routines, programs, objects, components, data structures, etc. that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

As previously indicated, embodiments in the present disclosure may be practiced in a networked environment using logical connections to one or more remote computers having processors. Those skilled in the art will appreciate that such network computing environments may encompass many types of computers, including personal computers, hand-held devices, multi-processor systems, microprocessor-based or programmable consumer electronics, network PCs, minicomputers, mainframe computers, and so on. Embodiments in the disclosure may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the disclosure might include one or more computers including a processor, a system memory or database, and a system bus that couples various system components including the system memory to the processor. The database or system memory may include read only memory (ROM) and random access memory (RAM). The database may also include a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media. The drives and their associated machine-readable media provide nonvolatile storage of machine-executable instructions, data structures, program modules and other data for the computer. User interfaces, as described herein, may include a computer with a monitor, a keyboard, a keypad, a mouse, a joystick or other input devices performing a similar function.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure. Such variations will depend on the software and hardware systems chosen and on designer choice. It is understood that all such variations are within the scope of the disclosure. Likewise, software and web implementations of the present invention could be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the subject matter to the precise form disclosed, and modifications and variations are possible in light of the above teachings or may be acquired from practice of the subject matter disclosed herein. The embodiments were chosen and described in order to explain the principals of the disclosed subject matter and its practical application to enable one skilled in the art to utilize the disclosed subject matter in various embodiments and with various modifications as are suited to the particular use contemplated. Other substitutions, modifications, changes and omissions may be made in the design, operating conditions and arrangement of the embodiments without departing from the scope of the presently disclosed subject matter.

Throughout the specification, numerous advantages of the exemplary embodiments have been identified. It will be understood, of course, that it is possible to employ the teachings herein without necessarily achieving the same advantages. Additionally, although many features have been described in the context of a particular data processor, it will be appreciated that such features could also be implemented in the context of other hardware configurations.

While the exemplary embodiments illustrated in the figures and described above are presently preferred, it should be understood that these embodiments are offered by way of example only. Other embodiments may include, for example, structures with different data mapping or different data. The disclosed subject matter is not limited to a particular embodiment, but extends to various modifications, combinations, and permutations that nevertheless fall within the scope and spirit of the appended claims.

What is claimed is:

1. A financial institution computing system, the system comprising:

a data storage system configured to retrievably store information relating to at least one customer account and one or more potential payees or payees associated with the at least one customer account;

a network interface logic configured to enable the financial institution computing system to exchange information over a network;

a check processing logic configured to:
obtain, for a plurality of paper checks, information provided on at least one of a front side and a back side of each paper check; and
identify, using the information obtained from the plurality of paper checks, a recipient and a customer account associated with each paper check; and a payment transaction logic configured to enable at least one of a P2P transaction feature and a bill pay feature, the payment transaction logic further configured to:
receive a first set of information from the check processing logic based on a first deposited paper check, the first set of information including a recipient and a customer account identified by the check processing logic as being associated with the first deposited paper check;
determine, using the information stored in the data storage system, whether the recipient of the first deposited check corresponds to a payee or a potential payee associated with the customer account associated with the first deposited paper check;
in response to determining that the recipient of the first deposited check does not correspond to a payee or a potential payee associated with the customer account associated with the first deposited check, create a potential payee for the customer account associated with the first deposited check, wherein the potential payee is stored in the data storage system and is based on the first set information received from the check processing logic;

receive a second set of information from the check processing logic based on a second deposited paper check, the second set of information including a recipient and a customer account identified by the check processing logic as being associated with the second deposited paper check, the customer account associated with the second deposited check being the same as the customer account associated with the first deposited paper check;

determine, using the information stored in the data storage system, that the recipient of the second deposited paper check corresponds to a potential payee associated with the customer account;

create, in response to determining that the recipient of the second deposited paper check corresponds to a potential payee associated with the customer account, a payee for the customer account based on the second set of information received from the check processing logic, wherein the created payee is selectable by a customer associated with the customer account to be a payee in at least one of a future electronic bill pay or P2P payment transaction;

store the payee in the data storage system; and generate a notification to the customer associated with the customer account alerting the customer that the payee has been created in the customer account.

2. The system of claim 1, wherein the payment transaction logic comprises a bill pay logic configured to enable a bill pay feature through the financial institution computing system and create and store the payee as a bill pay payee.

3. The system of claim 1, wherein the payment transaction logic comprises a P2P logic configured to enable a P2P transaction feature through the financial institution computing system and create and store the payee as a P2P payee.

4. The system of claim 3, wherein the P2P logic provides the P2P payee to the customer after the payee registers to use the P2P transaction feature.

5. The system of claim 4, wherein the payee maintains at least one account at the financial institution computing system, and wherein the payee is automatically registered to use the P2P transaction feature as a result of maintaining the at least one account.

6. The system of claim 1, wherein the payment transaction logic is configured to provide the payee along with an image of a paper check corresponding to the payee to the customer.

7. The system of claim 1, wherein the payment transaction logic is further configured to enable an auto pay function, and wherein the payment transaction logic provides generates a notification providing the customer with an option to activate the auto pay function to set up a recurring automatic payment to the payee of the deposited paper check.

8. The system of claim 7, wherein the option to activate the auto pay function includes an option to set an auto pay amount and an auto pay frequency.

9. The system of claim 8, wherein the auto pay amount is pre-populated with a paper check value extracted from at least one paper check.

10. The system of claim 8, wherein the auto pay frequency is pre-populated with a payment interval corresponding to at least two paper checks drafted to the payee.

11. The system of claim 1, wherein the check processing logic is further configured to determine whether the recipient maintains any accounts at the financial institution computing system, and notify a brick and mortar facility as to whether the recipient maintains any accounts at the financial institution computing system.

12. The system of claim 11, wherein the check processing logic is further configured to provide the number to the brick and mortar facility.

13. The system of claim 11, wherein the check processing logic is configured to receive a request from the brick and mortar facility to open a new financial account of the recipient, and to deposit at least a portion of the funds of the check deposit request into the new financial account.

14. The system of claim 1, wherein the check processing logic obtains the information from a deposited paper check by sending a request to a third party and receiving the information from the third party.

15. The system of claim 1, wherein the check processing logic obtains the information from a deposited paper check as at least one token, and wherein the potential payee includes the at least one token.

16. The system of claim 1, wherein the payee based on the second set of information received from the check processing logic is created in response to determining that the recipient associated with the second deposited paper check had previously been a recipient associated with a predetermined number of additional deposited checks, a customer account associated with each of the additional deposited checks being the same as the customer account associated with the second deposited check.

17. A method of generating payees from paper check deposit requests as performed by one or more logics at a financial institution computing system, the method comprising:

receiving, by a network interface logic and in response to a deposit of a first paper check, a first request to debit funds from an account of a customer;

obtaining, by a check processing logic, information provided on at least one of a front side or a back side of the first paper check;

identifying, using the information obtained by the check processing logic, a recipient of the first paper check, identifying, based on data retrievably stored in a data storage system, a customer profile associated with the account of the customer;

determining, using information associated with the customer profile stored in the data storage system, whether the recipient of the first paper check corresponds to a payee or a potential payee associated with the customer profile, creating, by a payment transaction logic and in response to determining that the recipient of the first check does not correspond to a payee or a potential payee associated with the customer profile, a potential payee for the customer profile, wherein the potential payee is stored in the data storage system and is based on the information obtained by the check processing logic from the first paper check;

receiving, by the network interface logic and in response to a deposit of a second paper check, a second request to debit funds from the account of the customer;

obtaining, by the check processing logic, information provided on at least one of a front side or a back side of the second paper check;

identifying, using the information obtained by the check processing logic, a recipient of the second paper check;

determining, using the information stored in the data storage system, that the recipient of the second deposited paper check corresponds to a potential payee associated with the customer profile;

creating, by the payment transaction logic and in response to determining that the recipient of the second deposited paper check corresponds to a potential payee associated with the customer profile a payee based on the recipient of the second deposited check, wherein the created payee is selectable by the customer to be a payee in a future electronic payment transaction;

storing, by the payment transaction logic, the payee in a data storage system; and generating, by the payment transaction logic, a notification alerting the customer that the payee has been created in the customer account.

18. The method of claim 17, further comprising determining, by the check processing logic, whether the recipient corresponding to the payee maintains any accounts at the financial institution computing system; and notifying, by the check processing logic, a brick and mortar facility if the recipient does not maintain any accounts at the financial institution computing system.

19. The method of claim 18, further comprising depositing, by the check processing logic, at least part of funds of a paper check deposit request in a new account owned by the recipient.

20. A financial institution computing system, the system comprising:

a data storage system configured to retrievably store information relating to at least one customer account and one or more potential payees or payees associated with the at least one customer account;

a network interface logic configured to enable the financial institution computing system to exchange information over a network;

a check processing logic configured to:
  obtain, for a plurality of paper checks, information provided on at least one of a front side and a back side of each paper check; and
  identify, using the information obtained from the plurality of paper checks, a recipient and a customer account associated with each paper check; and a payment transaction logic configured to:
  receive a first set of information from the check processing logic based on a first deposited paper check the first set of information including a recipient and a customer account identified by the check processing logic as being associated with the first deposited paper check;
  determine, using the information stored in the data storage system, whether the recipient of the first deposited check corresponds to a payee or a potential pa ee associated with the customer account associated with the first deposited paper check;
  in response to determining that the recipient of the first deposited check does not correspond to a payee or a potential payee associated with the customer account associated with the first deposited check, create a potential payee for the customer account associated with the first deposited check, wherein the potential payee is stored in the data storage system and is based on the first set of information received from the check processing logic;
  receive a second set of information from the check processing logic based on a second deposited paper check, the second set of information including a recipient and a customer account identified b the check processing logic as being associated with the second deposited paper check, the customer account associated with the second deposited check being the same as the customer account associated with the first deposited paper check;
  determine, using the information stored in the data storage system, that the recipient of the second deposited paper check corresponds to a potential payee associated with the customer account associated with each of the first deposited check and second deposited check;
  create, in response to determining that the recipient of the second deposited paper check corresponds to a potential payee associated with the customer account, a payee for the customer account based on the second set of information received from the check processing logic, wherein the created payee is selectable by a customer associated with the customer account to be a payee in a future electronic payment transaction;
  store the payee in the data storage system; and
  generate a notification to the customer associated with the customer account including an option to set up a recurring automatic payment to the recipient of the deposited second paper check.

* * * * *